US 11,174,873 B2

(12) United States Patent
Hasler et al.

(10) Patent No.: US 11,174,873 B2
(45) Date of Patent: Nov. 16, 2021

(54) DIFFUSER

(71) Applicant: Cummins Ltd., London (GB)

(72) Inventors: Craig S. T. Hasler, Huddersfield (GB);
John G. Campbell, Huddersfield (GB);
Ian Pridham, Huddersfield (GB)

(73) Assignee: Cummins Ltd, London (GB)

( * ) Notice: Subject to any disclaimer, the term of this patent is extended or adjusted under 35 U.S.C. 154(b) by 0 days.

(21) Appl. No.: 17/051,862

(22) PCT Filed: May 1, 2019

(86) PCT No.: PCT/GB2019/051203
§ 371 (c)(1),
(2) Date: Oct. 30, 2020

(87) PCT Pub. No.: WO2019/211603
PCT Pub. Date: Nov. 7, 2019

(65) Prior Publication Data
US 2021/0115945 A1    Apr. 22, 2021

(30) Foreign Application Priority Data

May 1, 2018   (GB) .................................... 1807179

(51) Int. Cl.
*F04D 29/44* (2006.01)
*F02C 6/12* (2006.01)
*F04D 27/02* (2006.01)

(52) U.S. Cl.
CPC .............. *F04D 29/441* (2013.01); *F02C 6/12* (2013.01); *F04D 27/0215* (2013.01); *F05D 2220/40* (2013.01); *F05D 2260/606* (2013.01)

(58) Field of Classification Search
CPC .......... F01D 25/243; F01D 25/30; F02C 6/12; F04D 27/0215; F04D 29/441; F05D 2220/40; F05D 2260/606
See application file for complete search history.

(56) References Cited

U.S. PATENT DOCUMENTS 6,202,413 B1    3/2001  Baker et al.
9,644,496 B2 *  5/2017  Lopez-Parra ........... F01D 25/30
(Continued)

FOREIGN PATENT DOCUMENTS

WO     2011/137004 A2    11/2011

OTHER PUBLICATIONS

International Preliminary Report on Patentability received for PCT Patent Application No. PCT/GB2019/051203, dated Nov. 12, 2020, 8 pages.

(Continued)

*Primary Examiner* — Jesse S Bogue
(74) *Attorney, Agent, or Firm* — Faegre Drinker Biddle & Reath LLP

(57) ABSTRACT

There is provided a diffuser for a turbine, comprising: a support configured to mount to a turbine housing; a diffuser body configured to receive fluid from an outlet of the turbine, the diffuser body defining a longitudinal axis and having a perimeter with a length measured in a plane normal to the longitudinal axis; and a bridge configured to connect the support to the diffuser body, wherein the connection between the bridge and the diffuser body is confined to a continuous portion of the perimeter of the diffuser body that is not more than around 50% of the total length of the perimeter of the diffuser body.

18 Claims, 8 Drawing Sheets

(56) References Cited

U.S. PATENT DOCUMENTS

| | | | | |
|---|---|---|---|---|
| 9,938,857 | B2* | 4/2018 | Mayer | F01D 9/023 |
| 10,494,990 | B2* | 12/2019 | Sauerstein | F01N 3/2006 |
| 10,731,546 | B2* | 8/2020 | McHenry | F01D 25/24 |
| 2015/0240656 | A1 | 8/2015 | Ehrhard et al. | |
| 2017/0370249 | A1 | 12/2017 | Kuno et al. | |
| 2018/0023459 | A1 | 1/2018 | Sauerstein et al. | |

OTHER PUBLICATIONS

International Search Report and Written Opinion received for PCT Patent Application No. PCT/GB19/051203, dated Aug. 8, 2019, 10 pages.

* cited by examiner

DIFFUSER

CROSS-REFERENCE TO RELATED APPLICATIONS

The present application is a national phase filing under 35 U.S.C. § 371 of International Application No. PCT/GB2019/051203, titled "DIFFUSER FOR A TURBOCHARGER, WITH A GEOMETRY REDUCING STRESS DUE TO THERMAL EXPANSION," filed on May 1, 2019, which claims priority to British Patent Application No. 1807179.5, filed on May 1, 2018, the entire disclosures of which being expressly incorporated herein by reference.

FIELD OF THE DISCLOSURE

The present disclosure relates to a diffuser for a turbine, and in particular to a diffuser for a turbine having a wastegate.

BACKGROUND

Turbines are machines which convert the potential energy of a fluid into mechanical work. Turbines comprise a turbine wheel and a turbine housing defining a turbine inlet and a turbine outlet. In use, fluid enters the turbine through the turbine inlet, where it is passed to the turbine wheel. The fluid impinges upon one or more blades defined by the turbine wheel, thus exerting a force upon the turbine wheel causing the turbine wheel to spin. Once the fluid has travelled through the turbine wheel, it exits the turbine via the turbine outlet. It is known to provide a bypass passage configured to permit fluid flow from the turbine inlet to the turbine outlet without passing through the turbine wheel. Such bypass passages are typically fitted with a valve, known as a wastegate, configured to permit or prevent flow through the bypass passage.

Some turbines comprise a diffuser positioned at the turbine outlet, downstream of the turbine wheel. Such a diffuser defines a passage which widens as the fluid travels further downstream of the turbine outlet. As the passage widens the velocity of the fluid in the diffuser will decrease resulting in a corresponding increase in pressure of the fluid in the diffuser. This is advantageous for example if the exhausted fluid is fed to a further downstream turbine, or where the turbine is part of an internal combustion engine system and the exhausted fluid is fed to an exhaust gas aftertreatment system. Furthermore, the use of such diffusers is known to increase the efficiency of the turbine.

It is known to provide a turbine having both a wastegate and a diffuser. However, interference between higher pressure fluid which has passed through the wastegate and lower pressure fluid which has passed through the turbine wheel can have undesirable effects which reduce the efficiency of the turbine. As such, it is desirable to maintain separation of the fluid leaving the turbine wheel and fluid which has bypassed the turbine until both streams of fluid are downstream of the diffuser. In some turbine arrangements, the diffuser is suspended within a hollow cylindrical support. The support forms part of a diffuser which is mounted to the turbine housing and partially defines the turbine outlet. Fluid exiting the turbine wheel is discharged directly into the diffuser, whilst fluid which has bypassed the turbine wheel is discharged into an annular region between the outside of the diffuser and the inside of the hollow cylinder defining the support. In this manner, separation between the aforementioned streams is maintained until both streams of fluid have passed downstream of the diffuser.

It is desirable to align the diffuser so that it is collinear to the axis of rotation of the turbine wheel. As such, struts extending between the support and the diffuser are provided in order to maintain the diffuser in the correct position relative to the axis of the turbine wheel. The struts are typically distributed about the perimeter of the diffuser such that there is an approximately equal distance between each strut. Diffusers having three or more struts circumferentially spaced about the perimeter of the diffuser are known.

In some applications, such turbines are used with an internal combustion engine. In these applications, the turbine receives hot exhaust gas which is then passed on to the diffuser. The diffuser will absorb heat energy from the exhaust gas, causing the diffuser to expand. However, the struts between the support and the diffuser react against the expansion of the diffuser itself and will constrain the amount of expansion which can occur. The reaction forces transmitted through the struts results in the formation of high stresses within the struts and the surrounding regions of the support and the diffuser. The presence of such high stresses can lead to crack formation and propagation. This problem is exacerbated when the turbine is not in continuous use and is allowed to cool down periodically (such as for example when the turbine is used within a vehicle).

SUMMARY

It is therefore an object of the disclosure to obviate or mitigate crack formation and propagation within diffusers for turbines. It is a further object of the disclosure to provide an alternative diffuser for a turbine.

According to a first aspect of the disclosure, there is provided a diffuser for a turbine, comprising:
  a support configured to mount to a turbine housing;
  a diffuser body configured to receive fluid from an outlet of the turbine, the diffuser body defining a longitudinal axis and having a perimeter with a length measured in a plane normal to the longitudinal axis; and
  a bridge configured to connect the support to the diffuser body, wherein the connection between the bridge and the diffuser body is confined to a continuous portion of the perimeter of the diffuser body that is not more than around 50% of the total length of the perimeter of the diffuser body.

By "perimeter" it is meant the two-dimensional line defined by the intersection between the outermost edge of the diffuser body and the plane normal to the longitudinal axis of the diffuser body. By "normal" it is meant that both dimensions of the plane are mutually orthogonal to the longitudinal axis of the diffuser body. By "continuous portion of the perimeter" it is meant a single integral section of the perimeter. That is to say, a part of the perimeter which is uninterrupted and that is not divided into separate spaced apart sections. By "confined" it is meant that the bridge only connects to the diffuser body within the continuous portion of the perimeter and does not connect to the diffuser outside of the continuous portion of the perimeter.

The fluid entering the diffuser is typically hotter than the temperature of the ambient environment (for example, where the fluid is exhaust gas from an internal combustion engine). Heat from the fluid is absorbed by the diffuser body which causes the diffuser body to expand. However, because the bridge only connects to the diffuser body within the region defined by the continuous portion of the perimeter, there are no means present outside of the continuous portion of the perimeter to prevent expansion of the diffuser body. Effectively, this separates the perimeter into a "confined portion" in which the connection between the diffuser body and the bridge is present, and an "unconfined portion" in which the connection between the diffuser body and the bridge is not present. Because the confined portion of the perimeter is not more than around 50% of the total perimeter of the diffuser body, this means that the unconfined portion is at least around 50% of the total perimeter. That is, the intention is that there is/are no connection/s between the diffuser body and the support across a continuous section of at least around 50% of the total perimeter of the diffuser body. As such, at least half of the perimeter of the diffuser body is able to expand in response to heating of the diffuser body. Furthermore, there are no forces acting upon the diffuser body in the unconfined portion of the perimeter to react against the expansion of the diffuser body. As such, the total force transmitted through the bridge is decreased, and hence the internal stress of the bridge is reduced. This reduces the occurrence of cracks forming within the bridge and thus lengthens the lifetime of the diffuser. By contrast, where the diffuser is supported by a number of struts spaced evenly about the longitudinal axis (i.e. where the confined portion of the perimeter is more than around 50% of the total perimeter), the struts work to collectively constrain expansion of the diffuser body about its entire perimeter. The struts react against the expansion of the diffuser body and cause the amount of force transmitted through the struts to increase. This creates higher mechanical stresses within the struts which are susceptible to crack formation.

The continuous portion of the perimeter of the diffuser body may be not more than around 33% of the length of the total perimeter of the diffuser body. When the confined region is not more than around 33% of the total perimeter, this means that the unconfined region is at least around 67% of the total perimeter. As such, a large majority of the perimeter of the diffuser body has no external forces acting upon it to prevent thermal expansion. Expansion of the diffuser body can therefore occur in a range of directions and therefore mechanical stress within the diffuser body and the bridge is better dissipated.

The continuous portion of the perimeter of the diffuser body has may be not more than around 18% of the total perimeter of the diffuser body. When the confined region is not more than around 18% of the total perimeter, this means that the unconfined region is at least around 82% of the total perimeter.

The turbine may be configured to receive exhaust gases from an internal combustion engine. In such embodiments, the bridge is configured so that the first modal frequency of the diffuser is above the first order firing frequency of an internal combustion engine. This may be achieved by selecting a length of the continuous portion of the perimeter of the diffuser body to ensure that the first modal frequency of the diffuser is above the first order firing frequency of the internal combustion engine. During use, the firing frequency of the internal combustion engine may cause the diffuser to vibrate. However, because the first modal frequency of the diffuser is above the first order firing frequency of an internal combustion engine, resonance of the diffuser body is avoided. As such, the bridge will provide adequate support to the diffuser body whilst also being narrow enough to allow sufficient expansion of the diffuser body.

The bridge may comprise a single continuous strut. As such, the bridge is able support the diffuser body for the entirety of the confined portion, and hence the mechanical stability of the bridge is improved. In some embodiments, the single strut may comprise one or more through holes. The through holes act to reduce the mass of the bridge.

The bridge may comprise a plurality of struts. Because there is more than one strut, the bridge is effectively split into separate parts. The separate parts of the bridge can be spaced apart from one another to define a gap therebetween. As such, the mass of the bridge is reduced which saves manufacturing cost, without compromising the structural support of the diffuser body.

The struts may define a flow passage therebetween. The flow passage provides a greater area for flow through the region between the diffuser body and the support, and hence the diffuser exhibits decreased resistance to fluid flow.

The bridge may comprise a lattice having a plurality of bridging members. It will be appreciated that the bridge may be substantially any structure configured to connect the diffuser body to the support.

The diffuser may be formed as a single integral piece. That is to say, the diffuser body, the bridge and the support are manufactured as a single piece of material. As such, mechanical interfaces between the bridge, the support and the diffuser body are avoided and therefore the overall structure of the diffuser is stronger. In such cases, the diffuser may be manufactured by casting.

The diffuser body and the support may define a gap in the plane normal to the longitudinal axis, the gap having ends defined by the diffuser body, the bridge and the support, and wherein the ends of the gap have a diameter which is greater than a width of the gap. Because the diameter of the ends is greater than the diameter of the gap, this reduces stress concentrations which could otherwise be amplified by the presence of tight corners or sharp edges. As such, the lifetime of the diffuser is improved.

The connection between the bridge and the diffuser body may be rounded. That is to say, surfaces of the diffuser body and the bridge in the region where the bridge connects to the diffuser body are filleted. The fillets avoid tight corners and sharp edges which would otherwise amplify stress concentrations.

The diffuser body may be generally frusto-conical and define a first end and a second end opposite the first end relative to the longitudinal axis, and the inner diameter of the first end of the diffuser body may be narrower than the inner diameter of the second end of the diffuser body. As such, the diameter of the diffuser body increases along the longitudinal axis. Furthermore, it will be appreciated that because the diffuser body is frusto-conical, the cross-section of the diffuser body in the plane relative to the longitudinal axis will be generally circular. As such, the perimeter of the diffuser body is the circumference of the diffuser body, and the confined portion of the perimeter is a continuous arc of the circumference. The extent of the confined portion may therefore be expressed in terms of the angle subtended by the arc relative to the longitudinal axis.

The diffuser body may comprise a perturbed surface. The perturbed surface acts to strengthen the diffuser such that the thickness of the diffuser can be reduced. The perturbed surface further improves the resistance of the diffuser body to vibrations. The perturbed surface may be for example a rib or a shoulder defined by the diffuser body. The perturbed surface may be positioned at the first end of the diffuser body.

The support may define an interior and wherein the diffuser body is positioned within the interior of the support, the diffuser body and the support being spaced apart from one another so as to define an outer flow region therebetween, the outer flow region being configured to receive fluid which has passed through a bypass passage of a wastegate of the turbine. As such, the support will surround the entire perimeter of the diffuser body. The fluid within the outer flow region is therefore kept separate from the fluid in the diffuser body until it has passed beyond the far end of the diffuser body relative to the turbine wheel.

The support may comprise a base, and during use the base may be mounted to the turbine housing and may be configured to channel fluid from the bypass passage of the wastegate to the outer flow region.

The diffuser body may be configured such that when it is exposed to a fluid at an operating temperature of the turbine, thermal expansion of the diffuser body can cause the longitudinal axis of the diffuser body to substantially align with a longitudinal axis of the turbocharger. As such, any misalignment between the turbine wheel and the diffuser body is minimised when the turbine is operating. Therefore, the flow through the diffuser is improved.

According to a second aspect of the disclosure there is provided a turbine comprising: a turbine housing defining a turbine inlet and a turbine outlet, a turbine wheel disposed within the turbine housing, a bypass passage configured to permit fluid flow from the turbine inlet to the turbine outlet without passing through the turbine wheel, a wastegate valve configured to selectively permit or prevent fluid flow through the bypass passage, and a diffuser according to the first aspect of the disclosure wherein the support is mounted to the turbine housing.

According to a third aspect of the disclosure, there is provided a diffuser for a turbine, wherein the turbine is configured to receive exhaust gas from an internal combustion engine, and wherein the diffuser comprises:

a support configured to mount to a turbine housing;
a diffuser body configured to receive exhaust gas from an outlet of the turbine, the diffuser body defining a longitudinal axis and having a perimeter with a length measured in a plane normal to the longitudinal axis; and
a bridge configured to connect the support to the diffuser body, wherein the connection between the bridge and the diffuser body is confined to a continuous portion of the perimeter of the diffuser body; and
wherein a length of the continuous portion of the perimeter of the diffuser body is configured so that the first modal frequency of the diffuser is above the first order firing frequency of the internal combustion engine.

The length of the continuous portion of the perimeter is preferably the length of the continuous portion measured around the perimeter of the diffuser body.

Preferably the connection between the bridge and the diffuser body is confined to a continuous portion of the perimeter of the diffuser body that is not more than around 50% of the total length of the perimeter of the diffuser body.

It will be appreciated that the optional features of the first aspect of the disclosure may be combined with the second or third aspects of the disclosure. It will further be appreciated that the above described advantages of the optional features of the first aspect of the disclosure will apply equally to the second and third aspects of the disclosure.

BRIEF DESCRIPTION OF THE DRAWINGS

Embodiments of the disclosure will now be described with reference to the accompanying drawings, in which.

DETAILED DESCRIPTION OF EMBODIMENTS OF THE DISCLOSURE

Figure 1:
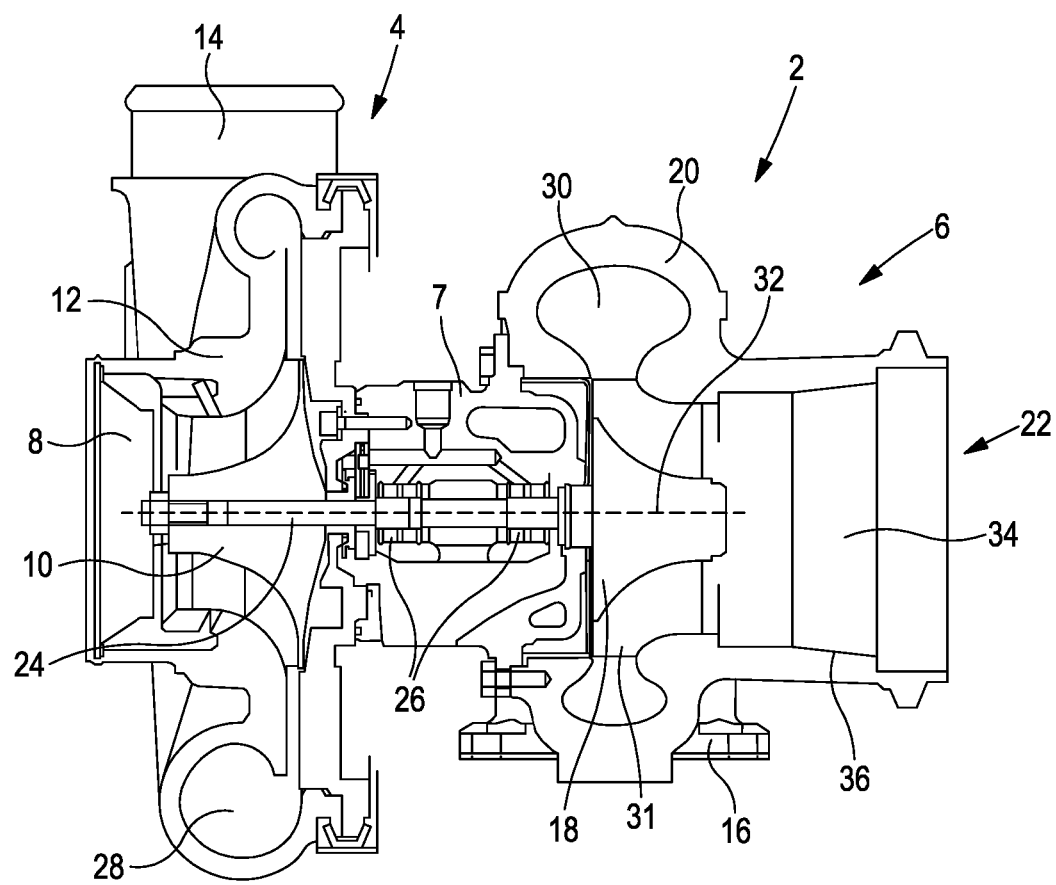
FIG. 1 is a cross-section of a turbocharger according to the prior art.

Like reference numerals are used to refer to equivalent features throughout the description and figures.

FIG. 1 shows a cross-section of a known turbocharger 2. The turbocharger 2 comprises a compressor 4, a turbine 6 and a bearing housing 7. The compressor 4 comprises a compressor inlet 8, a compressor wheel 10, a compressor housing 12, and a compressor outlet 14. The turbine 6 comprises a turbine inlet 16, a turbine wheel 18, a turbine housing 20 and a turbine outlet 22. The bearing housing 7 comprises bearings 26 which support a shaft 24 for rotation. The compressor wheel 10 and the turbine wheel 18 are fixedly mounted to the shaft 24 such that that compressor wheel 10 and the turbine wheel 18 rotate in unison.

During use, rotation of the compressor wheel 10 causes air to enter the compressor inlet 8. The air passes through the compressor wheel 10 and into a compressor volute 28 defined by the compressor housing 12. Due to the kinetic energy imparted on the incoming air by the compressor wheel 10, the air in the compressor volute 28 is at a higher pressure than the air entering the compressor inlet 8. The compressed air exits the compressor 4 via the compressor outlet 14 where it is delivered to an internal combustion engine (not shown). In some embodiments, the air passes through a heat exchanger to cool the air before it arrives at the internal combustion engine. Fuel is mixed with the air and the fuel-air mixture is combusted within the internal combustion engine. Due to the increased pressure of the air entering the internal combustion engine, a greater mass of oxygen is available for combustion and therefore more power can be produced by the internal combustion engine. The exhaust gases from the internal combustion engine are then passed to the turbine 6. The exhaust gases enter the turbine inlet 16 and pass into a turbine volute 30 defined by the turbine housing 20. The exhaust gases impinge upon one or more vanes 31 of the turbine wheel 18 which causes rotation of the turbine wheel 18 about a turbocharger axis 32. Rotation of the turbine wheel 18 drives rotation of the shaft 24 and the compressor wheel 10, thus driving the compressor 4.

The turbine 6 further comprises a diffuser 34 which is defined by a tapered wall 36 of the turbine housing 20 at the turbine outlet 22. The cross-sectional area of the diffuser 34 in a plane normal to the turbocharger axis 32 increases in a direction axially away from the turbine wheel 18. This causes the velocity of the exhaust gases exiting the turbine 6 to reduce and the pressure of the exhaust gases to increase (in accordance with the venturi effect). The outlet of the diffuser 34 is connected to an exhaust gas aftertreatment system (not shown) which will determine the pressure of the exhaust gases at the outlet of the diffuser 34. The presence of the diffuser 34 therefore has the effect of reducing the pressure of the exhaust gases at the exit of the turbine wheel 18. This increases the pressure difference between the turbine inlet 16 and the turbine outlet 22, thus increasing the amount of energy extracted from the exhaust gases and improving the efficiency of the turbine 6.

Figure 2:
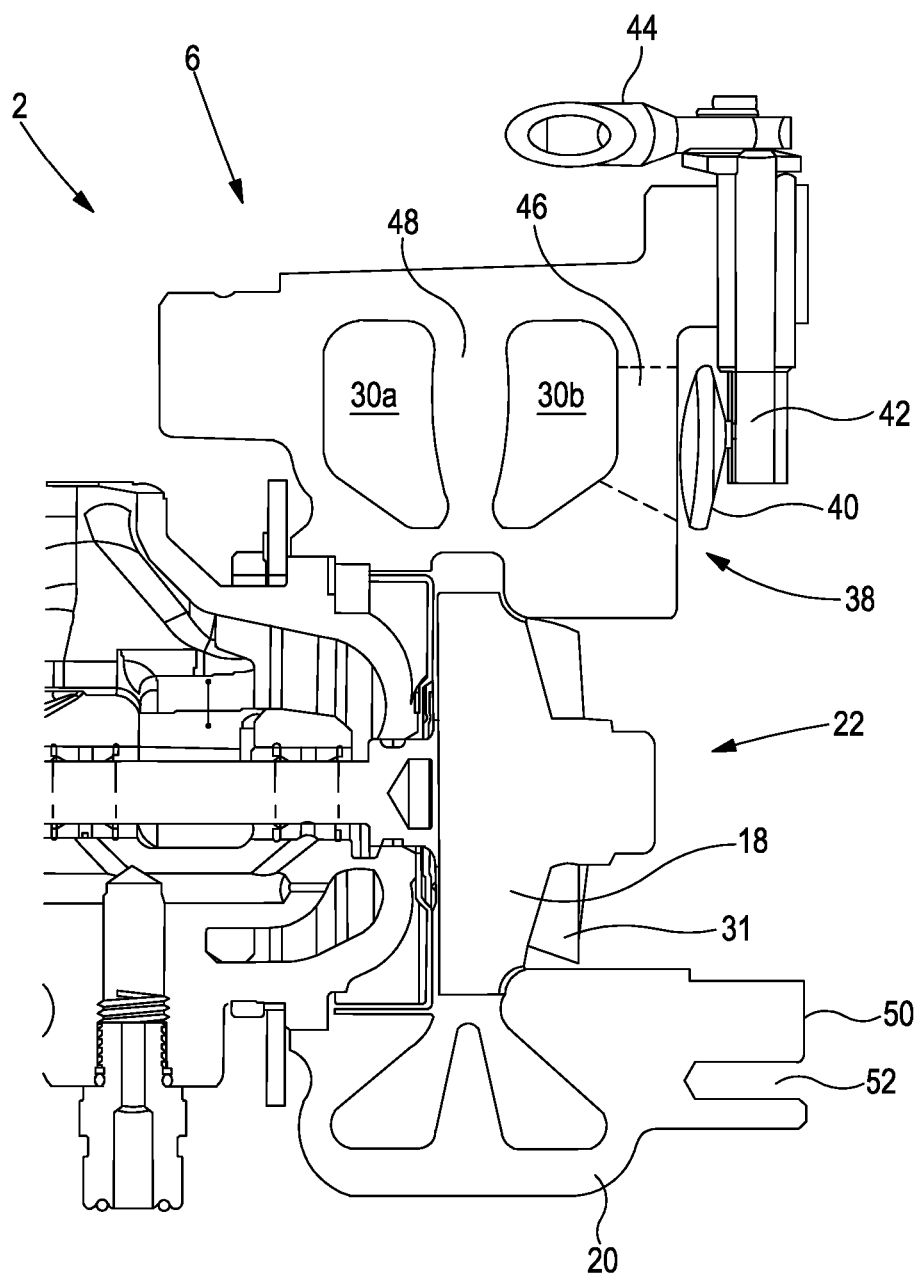
FIG. 2 is a cross-sectional view of a portion of a further known turbocharger comprising a wastegate.
Figure 3:
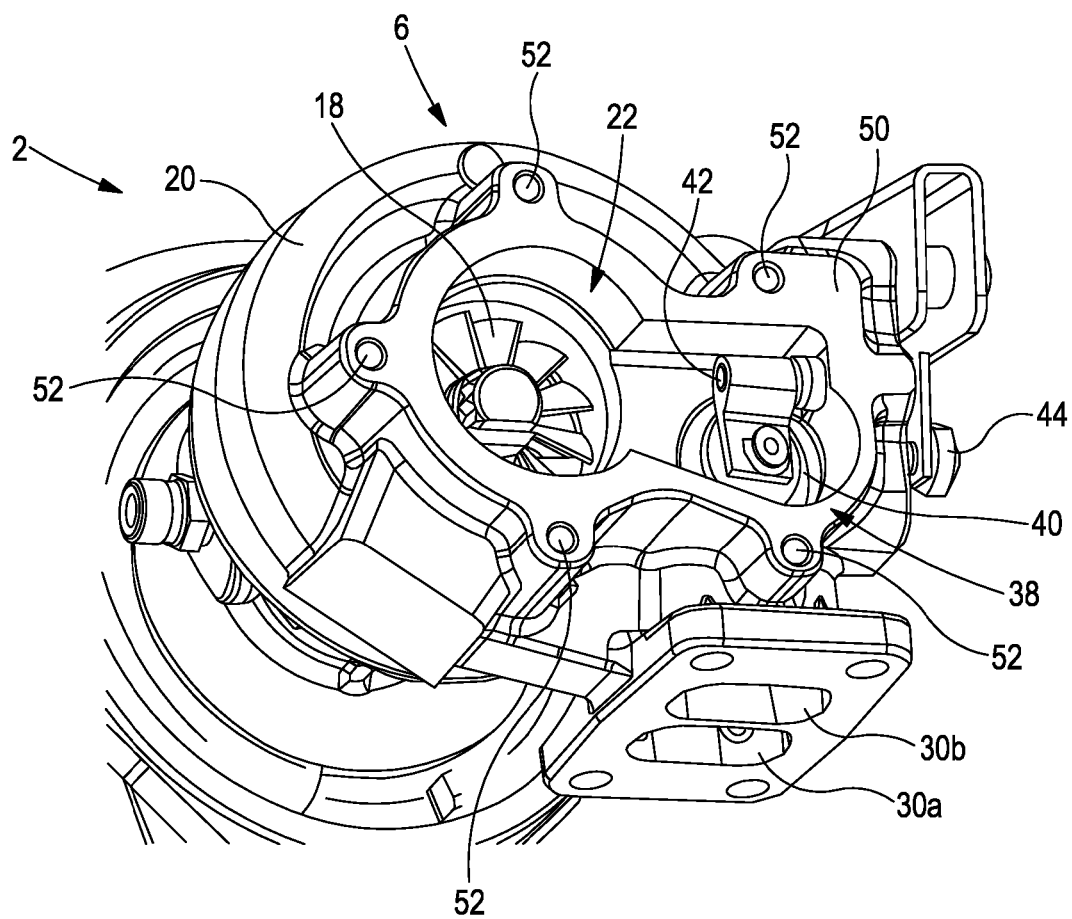
FIG. 3 is a perspective view of a portion of the turbocharger of FIG. 2.

FIGS. 2 and 3 show a further known turbocharger 2. The turbine 6 of the turbocharger 2 comprises a wastegate 38 including a wastegate valve 40, a valve shaft 42, and an actuating member 44. The turbine housing 20 comprises a divider 48 which separates the turbine volute 30 into a first volute 30a and a second volute 30b. The turbine housing 20 further defines a bypass passage 46 which passes from the first and/or second turbine volutes 30a, 30b to the turbine outlet 22. As shown most clearly in FIG. 3, the turbine housing 20 comprises an end face 50 which is configured for mating against a diffuser (not shown). The end face 50 comprises a number of mounting holes 52 which are configured to receive bolts so as to hold the diffuser against the turbine housing 20.

The wastegate valve 40 defines a closed position in which the wastegate valve 40 bears against the turbine housing 20 to cover the bypass passage 46 and an open position in which the wastegate valve 40 does not contact the turbine housing 20. Displacement of the actuating member 44 causes rotation of the valve shaft 42 and thus moves the wastegate valve 40 between the open and closed positions. When the wastegate valve 40 is in the closed position, exhaust gases are prevented from passing through the bypass passage 46. As such, all exhaust gases are made to flow through the turbine wheel 18. When the wastegate valve 40 is in the open position, some of the exhaust gas can flow from the first and/or second turbine volutes 30a, 30b directly to the turbine outlet 22 via the bypass passage 46 without passing through the turbine wheel 18. Because the gas passing through the bypass passage 46 does not impinge upon the turbine wheel 18, the amount of energy absorbed by the turbine wheel 18 from the exhaust gas decreases. The speed of rotation of the turbine wheel 18 reduces and therefore compression of the inlet air achieved by the compressor 4 is also reduced. As such, actuation of the wastegate valve 40 can be used to ensure the pressure increase produced by the compressor 4 is within acceptable levels for different engine operating conditions.

Figure 4:
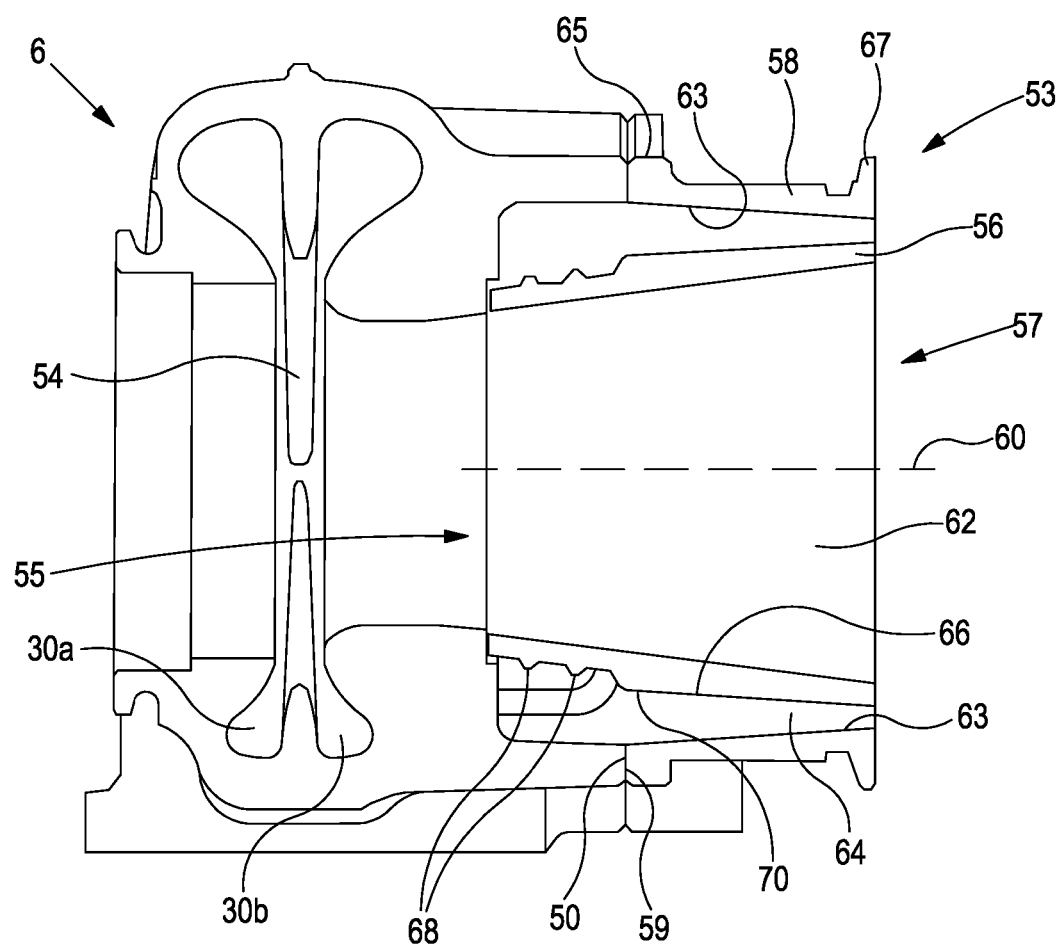
FIG. 4 is a cross-sectional view of a portion of a turbine according to the present disclosure.

FIG. 4 shows a cross-section of a turbine 6 according to the present disclosure. The turbine wheel 18 and the bearing housing 7 have been omitted from FIG. 4 for clarity. The turbine housing 20 defines a turbine cavity 54 within which the turbine wheel 18 is positioned during use. The turbine 6 comprises a diffuser 53 having a diffuser body 56, a support 58 and a mating face 59. The diffuser 53 is mounted to the turbine housing 20 such that the mating face 59 of the diffuser 53 abuts the end face 50 of the turbine housing 20. The turbine 6 comprises two turbine volutes 30a, 30b, however it will be appreciated that in alternative embodiments the turbine 6 may comprise a single volute, such as described above in relation to FIG. 1.

The diffuser body 56 is generally frusto-conical such that it defines a longitudinal axis 60. The diffuser body 56 is hollow and defines an inner flow region 62 that is open at opposite ends relative to the longitudinal axis 60 so as to receive and discharge fluid from the turbine wheel 18 (not shown). The diffuser body 56 defines a first end 55 and a second end 57 relative to the longitudinal axis 60. During use, the first end 55 is positioned adjacent to the turbine wheel 18. The first end 55 defines an inner diameter which is narrower than an inner diameter of the second end 57, such that the inner diameter of the diffuser body 56 increases along the longitudinal axis 60 in the direction away from the turbine wheel 18.

The diffuser body 56 further defines an outer wall 66. The support 58 is generally cylindrical and is aligned along the longitudinal axis 60 of the diffuser body 56. The support 58 is hollow and comprises an inner wall 63. The inner wall 63 of the support 58 defines a diameter which is larger than the diameter of the outer wall 66 of the diffuser body 56. The diffuser body 56 is positioned within the interior of the support such that the support 58 surrounds the entire perimeter of the diffuser body 56 in a plane normal to the longitudinal axis 60. An outer flow region 64 is formed between the inner wall 63 of the support 58 and the outer wall 66 of the diffuser body 56, the outer flow region 64 being generally annular. The longitudinal axis 60 is aligned with the turbocharger axis 32 of the turbocharger 2 such that the diffuser body 56 and the support 58 are concentric. During use, the longitudinal axis 60 of the diffuser body is aligned so that it is substantially collinear to the turbocharger axis 32 of the turbocharger 2.

The support 58 comprises a first end 65 and a second end 67, opposite the first end 65 relative to the longitudinal axis 60. The first end 65 of the support 58 is mounted to the turbine housing 20. The inner wall 63 of the support 58 is slightly tapered, such that it defines a larger diameter at the first end 65 and a narrower diameter at the second end 67. However, in alternative embodiments the inner wall 63 may have a narrower diameter at the end of the support 64 closer to the turbine housing 20. In such embodiments the taper of the inner wall 63 may be chosen to match that of diffuser body 56 and in particular the taper of the outer wall 66 of the diffuser body 56. Alternatively, the inner wall 63 may have a constant diameter (i.e. such that it has no taper).

The outer wall 66 of the diffuser body 56 comprises a pair of circumferentially extending ribs 68 positioned adjacent to the first end 55 of the diffuser body 56 (i.e. the end closest to the turbine wheel 18) and a shoulder 70 positioned approximately halfway along the diffuser body 56 relative to the longitudinal axis 60. As can be seen most clearly in FIG. 4, the portion of the diffuser body 56 closest to the turbine wheel 18 has a reduced thickness. Reducing the thickness of the diffuser body 56 leads to reduced material usage and therefore reduced manufacturing costs. However, reducing the thickness of the diffuser body 56 has an adverse effect on the strength of the diffuser body 56 and in particular the resistance of the diffuser body 56 to fatigue caused by vibrations. The ribs 68 and shoulder 70 define perturbed surfaces relative to the outer wall 66 which act to strengthen the diffuser body 56 and improve the resistance of the diffuser body 56 to vibrations. The ribs 68 and shoulder 70 extend radially outwards relative to the longitudinal axis 60 from the outer wall 66 relative to the longitudinal axis 60. However, it will be appreciated that in alternative embodiments of the disclosure the ribs 60 may not be present.

Figure 5:
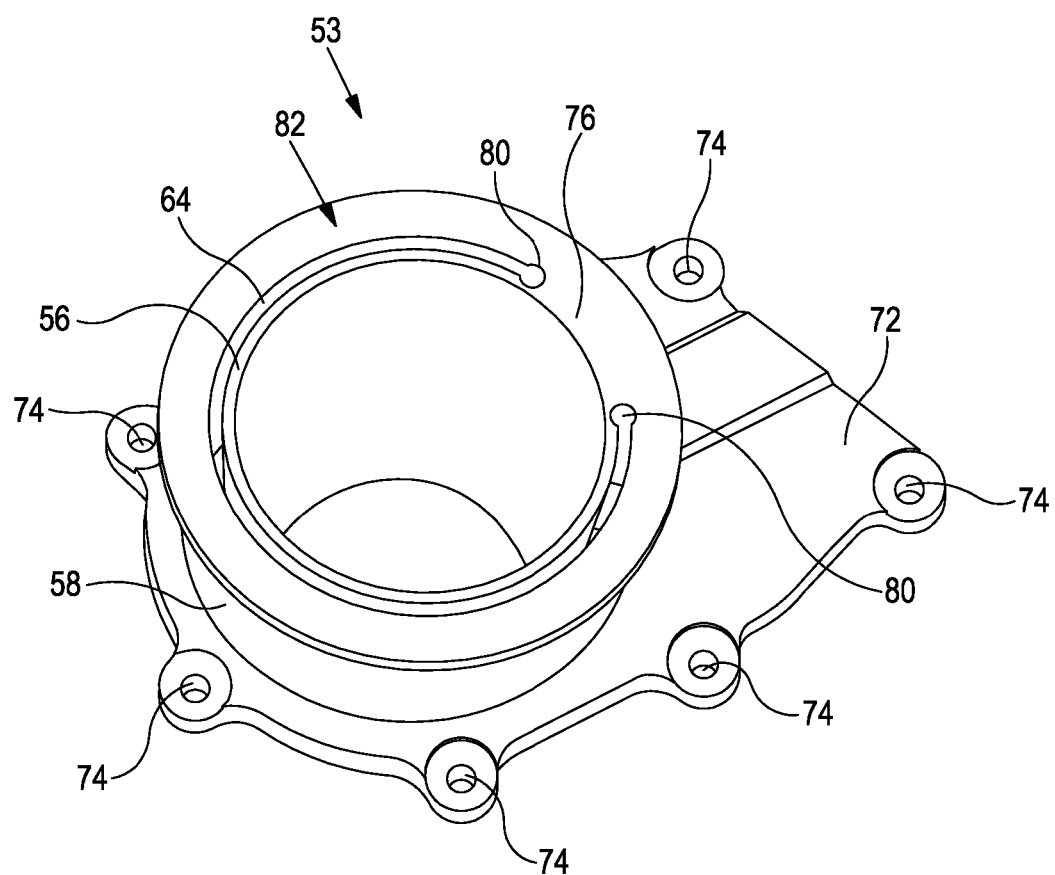
FIG. 5 is a perspective view of a portion of the turbine of FIG. 4.

FIG. 5 shows a perspective view of the diffuser 53 of FIG. 4. The diffuser 53 further comprises a base 72, mounting holes 74, and a bridge 76. The base 72 extends from the support 58 in a direction normal to the longitudinal axis 60 of the diffuser body 56 (see FIG. 4) and may be considered as part of the support 58. A reverse side of the base 72 not visible in FIG. 5 defines the mating face 59 which abuts the end face 50 of the turbine housing 20. When the diffuser 53 is mounted to the turbine housing 20, the mounting holes 74 of the diffuser 53 align with the mounting holes 52 of the turbine housing 20. Bolts are passed through the mounting holes 52, 74 so as to secure the diffuser 53 to the turbine housing 20. It will be appreciated that in alternative embodiments of the disclosure, the base 72 may be part of the turbine housing 20 rather than the diffuser 53. In such embodiments, the support 58 may be mounted directly to the turbine housing 20.

The base 72 covers the region of the turbine outlet 22 immediately downstream of the wastegate 38. As such, exhaust gases which have bypassed the turbine wheel 18 via the wastegate 38 are trapped between the turbine housing 20 and the base 72 of the diffuser 53. The shape of the turbine outlet 22 is such that the exhaust gases are channeled into the outer flow region 64 surrounding the diffuser body 56. The exhaust gases which have passed through the wastegate 38 therefore remain separated from the exhaust gas that has passed through the turbine wheel 18 until both streams of exhaust gas have passed beyond the second end 57 of the diffuser body 56.

The bridge 76 connects the support 58 and the diffuser body 56 so as to hold the diffuser body 56 in position relative to the support 58. In the embodiment shown in FIG. 5, the bridge 76 is a single continuous strut. Other means of connecting the diffuser body 56 to the support 58 are contemplated and are described in more detail below. Although not shown, the bridge 76 defines a depth in a direction parallel to the longitudinal axis 60 of the diffuser body 56 (that is to say, from left to right in FIG. 4). In the present embodiment, the bridge 76 extends from the first face 65 to the second face 67 of diffuser 53. Preferably, the depth of the bridge 76 is no less than around 30% of the length of the diffuser body 56 in the direction parallel to the longitudinal axis 60. However, it will be appreciated that the depth of the bridge 76 may extend any suitable amount relative to the longitudinal axis 60.

There are no other means which connect the diffuser body 56 to the support 58 and therefore the bridge 76 is the only part of the diffuser 53 which provides structural support to the diffuser body 56. The diffuser body 56 defines a perimeter in a plane normal to the longitudinal axis 60 of the diffuser body 56. The portion of the perimeter of the diffuser body 56 that is connected to the bridge 76 will be referred to herein as the "constrained portion", whilst the portion of the perimeter of the diffuser body 56 which is not supported by the bridge 76 will be referred to herein as the "unconstrained portion". The unconstrained portion extends continuously around the majority of the perimeter of the diffuser body 56.

During use, due to the combustion of fuel in the internal combustion engine, the exhaust gases entering the turbine 6 will be hot. The wastegate valve 40 is typically positioned in the closed position such that the majority of the exhaust gases leaving the internal combustion engine will pass through the turbine wheel 18 and not the bypass passage 46. As such, the diffuser body 56 is exposed to a greater volume of hot gas than the support 58. The amount of heat absorbed by the diffuser body 56 will be more than the amount of heat absorbed by the support 58 and therefore the diffuser body 56 will expand more than the support 58.

In prior art diffuser arrangements, it is known to use a plurality of struts spaced equally around the perimeter of the diffuser to join the diffuser to the support. Because the struts are spaced around the entire perimeter of the diffuser the struts act to constrain expansion of the diffuser in all directions relative to the longitudinal axis of the diffuser. That is to say, the struts and the support do not permit movement of the diffuser in any particular direction and in fact act to prevent any movement of the diffuser relative to the longitudinal axis. The support exerts a reaction force upon the diffuser through the struts and consequently high internal stresses develop within the struts. Put another way, as the diffuser heats up its internal energy will increase. Because the diffuser is prevented from expanding, the increase in internal energy is not dissipated. The increased internal energy manifests itself as potential energy causing increased mechanical stress within the struts. The regions of high stress are susceptible to cracking which will reduce the in-service life of the diffuser. Any cracks are likely to grow as the diffuser expands and contracts in response to changing temperatures such as, for example, where the turbine is only in use periodically (e.g. within a vehicle).

In the present disclosure, the unconstrained portion of the diffuser body 56 has no external forces acting upon it to prevent its expansion. In particular, the unconstrained portion of the perimeter of the diffuser body 56 extends continuously around a majority of the perimeter and therefore the diffuser body 56 is free to expand in a direction generally away from the bridge 76 as it heats up. Since there is nothing to react against the expansion of the diffuser body 56 in the direction away from the bridge 76, the total force acting on the bridge 76 is reduced. Because the forces transmitted through the bridge 76 are lower, the mechanical stress in the bridge 76 is reduced and the fatigue life of the diffuser body 56 is increased. Put another way, because the diffuser body 56 is allowed to expand, the increase in internal energy of the diffuser body 56 due to heating is dissipated around the unconstrained portion of the perimeter, and consequently lower mechanical stress is developed in the bridge 76.

The diffuser 53 is preferably formed as a single integral piece of material which is manufactured by casting. It will be appreciated that where the diffuser 53 is cast as a single piece no mechanical interface is present between the diffuser body 56 and the support 58 and therefore the join between the diffuser body 56 and the support 58 is strong. However, it will be appreciated that in alternative embodiments of the disclosure the diffuser body 56 and the support 58 may be formed separately, such that they are not integral. In such cases the bridge 76 may be defined by the diffuser body 56 and/or may be defined by the support 58. Alternatively, the bridge 76 may be formed separately from both the diffuser body 56 and the support 58.

In the embodiment shown in FIG. 5, the bridge 76 is positioned so as to extend from the same side of the longitudinal axis 60 of the diffuser body 56 as the base 72. However, it will be appreciated that the bridge 76 may be positioned substantially anywhere around the perimeter of the diffuser body 56 in the plane normal to the longitudinal axis 60 (that is to say, at substantially any angle relative to the longitudinal axis 60). In particular, the position of the bridge 76 relative to the base 72 may be selected based upon manufacturing requirements such as for example to enable casting of the diffuser 53.

Figure 6:
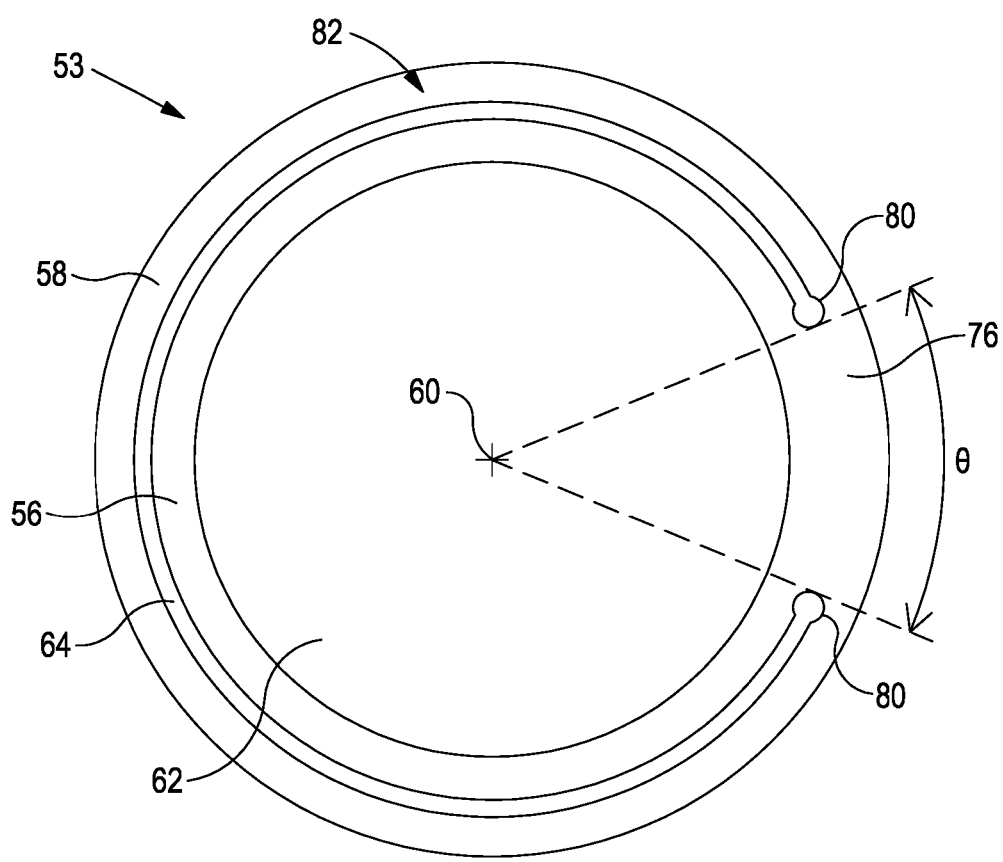
FIG. 6 is a schematic plan view of a portion of the turbine of FIG. 4.

FIG. 6 shows a schematic plan view of the diffuser 53 of the embodiment of FIG. 5, with the base 72 of the diffuser 53 omitted for clarity. The bridge 76 is continuous and subtends an angle θ relative to the longitudinal axis 60. So as to permit movement of the diffuser body 56 generally away from the bridge 76, the angle θ should be no more than 180°. It will be appreciated that the diffuser body 56 is able to expand in any direction radially outwards from the longitudinal axis 60 which is not constrained by the bridge 76. As such, when the angle θ is reduced, the diffuser body 56 is able to expand over a larger range of directions. From this perspective, it is therefore beneficial to minimise the angle θ subtended by the bridge 76 relative to the longitudinal axis 60 so as to reduce the proportion of the perimeter of the diffuser body 56 that is confined by the bridge 76. However, the angle θ should be sufficient for the bridge 76 to provide structural support to the diffuser body 56 to hold it in position relative to the support 58. The size of the bridge 76 may also be chosen so as to minimise any detrimental resonance effects caused by vibrations. For example, the size of the bridge 76 may be chosen so that the first modal frequency of the diffuser 53 is above the nominal first order firing frequency of the internal combustion engine. Therefore, preferably the angle θ is in the range around 5° to around 120°, more preferably around 30° to around 90°, and most preferably around 45° to 65°. More specifically, angle θ may be around 90°, around 65°, around 60°, around 45°, or around 30°.

It will be appreciated that in alternative embodiments of the disclosure the diffuser body 56 and the support 58 may define non-circular cross-sections. For example, the diffuser body 56 and/or the support 58 could define square cross-sections. The extent of the constrained portion of the perimeter of the diffuser body 56 may be expressed as a proportion of the total perimeter of the diffuser body 56, regardless of the geometry of the diffuser body 56 and/or support 58. In particular, the constrained portion of the perimeter of the diffuser body 56 should be no more than around 50% of the total perimeter of the diffuser body 56. Preferably, the constrained portion of the perimeter of the diffuser body 56 extends in the range around 1% to around 33% of the length of the total perimeter, more preferably around 8% to around 25%, and most preferably around 12% to around 18%. More specifically, the constrained portion of the perimeter of the diffuser body 56 extends over around 25%, around 18%, around 17%, around 13%, or around 8% of the length of the total perimeter.

As shown most clearly in FIGS. 5 and 6, the outer flow region 64 terminates in a generally annular gap 82 between the inner wall 63 of the support 58 and the outer wall 66 of the diffuser body 56 on the side of the diffuser 53 furthest from the turbine wheel 18. The gap 82 defines ends 80 relative to the plane normal to the longitudinal axis 60. The ends 80 are defined by the diffuser body 56, the bridge 76 and the support 58. The ends 80 are positioned at circumferentially opposite ends of the gap 82. The ends 80 define a diameter which is wider than a width of the gap 82. The increased diameter of the ends 80 relative to the width of the rest of the gap 82 avoids the occurrence of sharp or tight edges which could amplify any stress within the bridge 76 that develops during use. The interfaces between the surfaces of the diffuser body 56, the bridge 76, and the support 58 are also rounded (i.e. filleted) which further acts to reduce stress concentrations.

Figure 7:
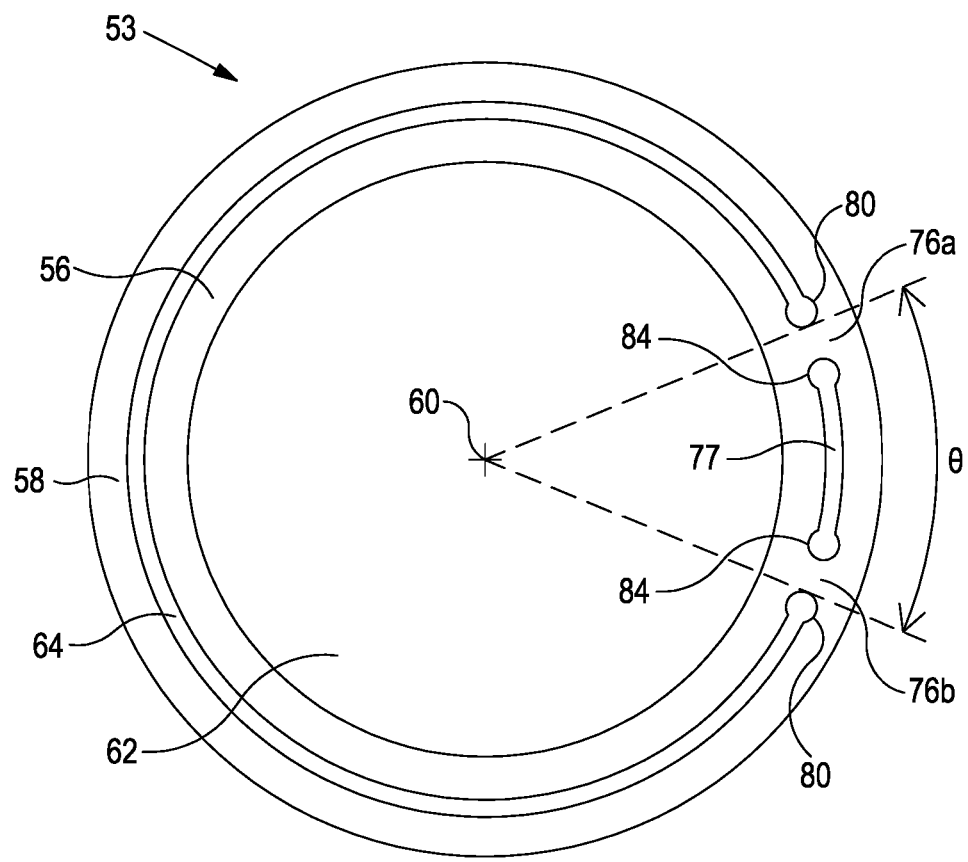
FIG. 7 is a schematic plan view of a portion of a turbine according to a further embodiment of the present disclosure.

FIG. 7 shows a schematic plan view of a further embodiment of the diffuser 53 according to the present disclosure. In the embodiment of FIG. 7, the bridge 76 is not continuous, and comprises two struts 76a, 76b which connect the support 58 to the diffuser body 56. The struts 76a, 76b define a flow passage 77 therebetween which communicates with the outer flow region 64. Because of the presence of the flow passage 77, there are no means in the portion of the perimeter of the diffuser body 56 between the struts 76a, 76b to support the diffuser body 56. The diffuser body 56 can therefore expand within this region. Furthermore, the flow passage 77 provides a greater area for the transmission of exhaust gases through the outer flow region 64 and thus provides less resistance to flow.

The struts 76a, 76b are angularly spaced apart from one another such that they connect to the diffuser body 56 within the portion of the perimeter of the diffuser body 56 defined by the angle θ. The unconstrained portion of the perimeter of the diffuser body 56 is therefore the portion of the perimeter of the diffuser body 56 which lies outside of the portion subtended by the angle θ as in the embodiment of FIGS. 5 and 6. Therefore, during use, when the diffuser body 56 heats up and expands, it behaves in the same way as described above in relation to FIGS. 5 and 6 (i.e. it deforms in the direction generally away from the struts 76a, 76b).

The flow passage 77 defines ends 84 relative to the plane normal to the longitudinal axis 60. The ends 84 are defined by the support 58, struts 76a, 76b and diffuser body 56. As with ends 80 in the FIGS. 5 and 6 embodiment, ends 84 have a diameter which is larger than the width of the flow passage 77. As such, the ends 84 further reduce any stress concentrated in the struts 76a, 76b in the same manner as discussed above in relation to the ends 80 of the gap 82.

It will be appreciated that alternative embodiments of the disclosure may comprise additional struts such as the struts 76a, 76b provided that any such additional struts are positioned within the constrained portion of the perimeter of the diffuser body 56, i.e. between the struts 76a, 76b in FIG. 7 and within the angle θ.

Figure 8:
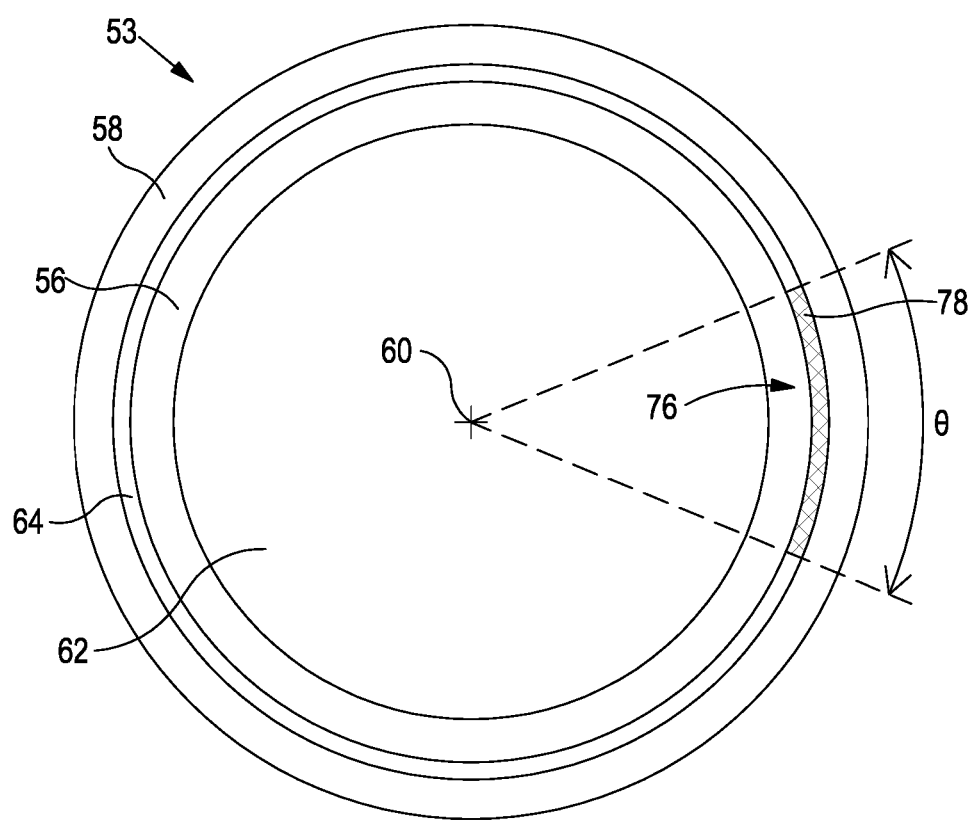
FIG. 8 is a schematic plan view of a portion of a turbine according to yet a further embodiment of the present disclosure.

FIG. 8 shows a schematic plan view of another embodiment of the diffuser 53 according to the present disclosure. In the embodiment of FIG. 8, the diffuser body 56 is connected to the support 58 by a bridge 76 in the form of a lattice 78. The lattice 78 is composed of a plurality of individual bridging members which are interlinked so as to create a rigid structure capable of holding the diffuser body 56 in position relative to the support 58. The extent of the lattice 78 about the longitudinal axis 60 of the diffuser body 56 subtends the angle θ so as to define the constrained portion of the perimeter of the diffuser body 56. It will be appreciated that the bridge 76 may be substantially any structure capable of connecting the support 58 to the diffuser body 56 and that the lattice 78 depicted in FIG. 8 is just one preferred embodiment.

It will be appreciated that as the diffuser body 56 expands, the longitudinal axis 60 of the diffuser body 56 may move away from the bridge 76. As such, the longitudinal axis 60 of the diffuser will no longer be precisely aligned with the turbocharger axis 32. However, it is envisaged that the amount of movement of the longitudinal axis 60 will be very small in comparison to the diameter of the diffuser body 56, and therefore any adverse flow effects resulting from such misalignment will be negligible. In an alternative embodiment, the geometry of the diffuser body 56 may be such that the longitudinal axis 60 of the diffuser body 56 displaces such that it becomes aligned with the turbocharger axis 32 when the diffuser body 56 has expanded (i.e. when the internal combustion engine is running). In this embodiment, when the internal combustion engine is not running and the diffuser body 56 is below operating temperatures the longitudinal axis 60 of the diffuser body 56 and the turbocharger axis 32 may be intentionally misaligned to a predetermined extent.

The invention claimed is:
1. A diffuser for a turbine, comprising:
a support configured to mount to a turbine housing;
a diffuser body configured to receive fluid from an outlet of the turbine, the diffuser body defining a longitudinal axis and having a perimeter with a length measured in a plane normal to the longitudinal axis; and a bridge configured to connect the support to the diffuser body, wherein the connection between the bridge and the diffuser body is confined to a continuous portion of the perimeter of the diffuser body that is not more than around 50% of the total length of the perimeter of the diffuser body.

2. A diffuser according to claim 1, wherein the continuous portion of the perimeter of the diffuser body is not more than around 33% of the length of the total perimeter of the diffuser body.

3. A diffuser according to claim 1, wherein the continuous portion of the perimeter of the diffuser body is not more than around 18% of the total perimeter of the diffuser body.

4. A diffuser according to claim 1, wherein the turbine is configured to receive exhaust gases from an internal combustion engine, and wherein the bridge is configured so that the first modal frequency of the diffuser is above the first order firing frequency of the internal combustion engine.

5. A diffuser according to claim 1, wherein the bridge comprises a single continuous strut.

6. A diffuser according to claim 1, wherein the bridge comprises a plurality of struts.

7. A diffuser according to claim 6, wherein the struts define a flow passage therebetween.

8. A diffuser according to claim 1, wherein the bridge comprises a lattice having a plurality of bridging members.

9. A diffuser according to claim 1, wherein the diffuser is formed as a single integral piece.

10. A diffuser according to claim 1, wherein the diffuser body and the support define a gap in the plane normal to the longitudinal axis, the gap having ends defined by the diffuser body, the bridge and the support, and wherein the ends of the gap have a diameter which is greater than a width of the gap.

11. A diffuser according to claim 1, wherein the connection between the bridge and the diffuser body is rounded.

12. A diffuser according to claim 1, wherein the diffuser body is generally frusto-conical and defines a first end and a second end opposite the first end relative to the longitudinal axis, and wherein the inner diameter of the first end of the diffuser body is narrower than the inner diameter of the second end of the diffuser body.

13. A diffuser according to claim 1, wherein the diffuser body comprises a perturbed surface.

14. A diffuser according to claim 1, wherein the support defines an interior and wherein the diffuser body is positioned within the interior of the support, the diffuser body and the support being spaced apart from one another so as to define an outer flow region therebetween, the outer flow region being configured to receive fluid which has passed through a bypass passage of a wastegate of the turbine.

15. A diffuser according to claim 14, wherein the support comprises a base, and wherein during use the base is mounted to the turbine housing and is configured to channel fluid from the bypass passage of the wastegate to the outer flow region.

16. A diffuser according to claim 1, wherein the diffuser body is configured such that when it is exposed to a fluid at an operating temperature of the turbine, thermal expansion of the diffuser body can cause the longitudinal axis of the diffuser body to substantially align with a longitudinal axis of the turbocharger.

17. A turbine comprising:
a turbine housing defining a turbine inlet and a turbine outlet;
a turbine wheel disposed within the turbine housing;
a bypass passage configured to permit fluid flow from the turbine inlet to the turbine outlet without passing through the turbine wheel;
a wastegate valve configured to selectively permit or prevent fluid flow through the bypass passage; and
a diffuser according to claim 1 wherein the support is mounted to the turbine housing.

18. A diffuser for a turbine, wherein the turbine is configured to receive exhaust gas from an internal combustion engine, and wherein the diffuser comprises:
a support configured to mount to a turbine housing;
a diffuser body configured to receive exhaust gas from an outlet of the turbine, the diffuser body defining a longitudinal axis and having a perimeter with a length measured in a plane normal to the longitudinal axis; and
a bridge configured to connect the support to the diffuser body, wherein the connection between the bridge and the diffuser body is confined to a continuous portion of the perimeter of the diffuser body;
wherein a length of the continuous portion of the perimeter of the diffuser body is configured so that the first modal frequency of the diffuser is above the first order firing frequency of the internal combustion engine.

* * * * *